(12) United States Patent
Riley et al.

(10) Patent No.: US 7,227,129 B2
(45) Date of Patent: Jun. 5, 2007

(54) FLOWSHOT TECHNIQUE

(75) Inventors: Stephen Riley, Spring, TX (US);
Benoit J. Guivarch, Portsall (FR);
Darryl E. Trcka, Houston, TX (US);
David M. Chace, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/158,500

(22) Filed: Jun. 22, 2005

(65) Prior Publication Data

US 2005/0284627 A1     Dec. 29, 2005

Related U.S. Application Data

(63) Continuation-in-part of application No. 10/879,620, filed on Jun. 29, 2004.

(51) Int. Cl.
*G01V 5/10* (2006.01)
(52) U.S. Cl. .................. 250/269.6; 250/269.7
(58) Field of Classification Search ........... 250/269.6, 250/269.7
See application file for complete search history.

(56) References Cited

U.S. PATENT DOCUMENTS

| 3,603,795 | A | 9/1971 | Allaud | 250/83.3 |
|---|---|---|---|---|
| 4,032,780 | A | 6/1977 | Paap et al. | 250/266 |
| 4,503,328 | A | 3/1985 | Neufeld | 250/262 |
| 5,404,752 | A | 4/1995 | Chace et al. | 73/155 |
| 5,461,909 | A | 10/1995 | Arnold | 73/155 |
| 6,023,443 | A | 2/2000 | Dubinsky et al. | 367/76 |

OTHER PUBLICATIONS

Statement of Stephen Riley.

*Primary Examiner*—Constantine Hannaher
(74) *Attorney, Agent, or Firm*—Madan, Mossman & Sriram, P.C.

(57) ABSTRACT

A pulsed neutron source irradiates an earth formation. The irradiation produces $N^{16}$ from $O^{16}$ in a fluid in the borehole, and the gamma rays produced by the subsequent decay of $N^{16}$ are detected by a plurality of spaced apart detectors. The count rates of the detectors are accumulated over a time sampling interval to produce temporal signals. Processing of the temporal signals using correlation, differentiation and/or semblance techniques is used for determination of the flow velocity of one or more fluids in the borehole.

34 Claims, 4 Drawing Sheets

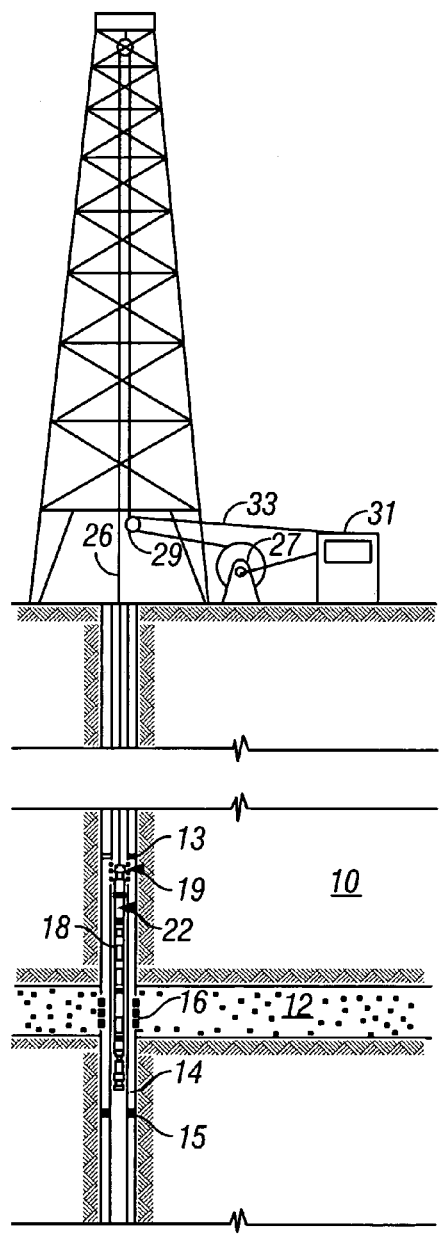
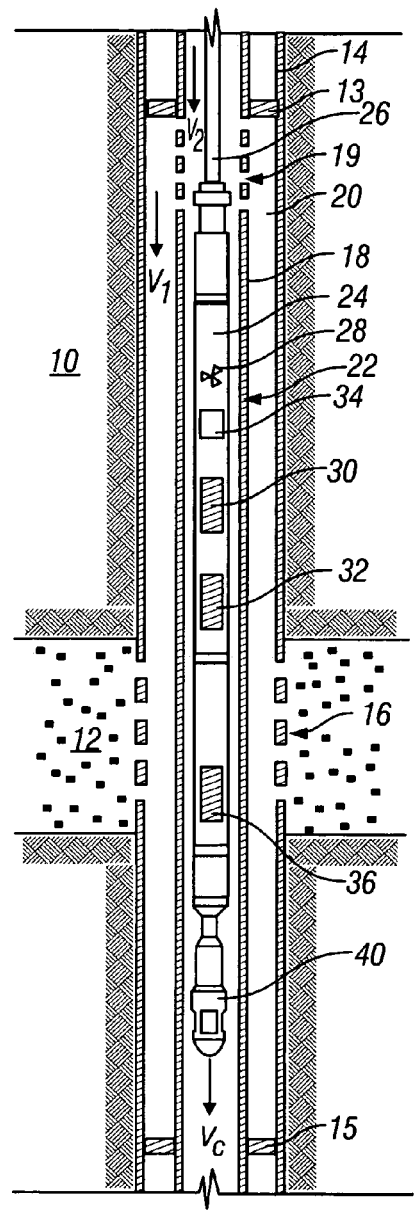
FIG. 1
(Prior Art)
FIG. 2
(Prior Art)

FLOWSHOT TECHNIQUE

CROSS-REFERENCES TO RELATED APPLICATIONS

This application is a continuation-in-part of U.S. patent application Ser. No. 10/879,620 filed on Jun. 29, 2004.

BACKGROUND OF THE INVENTION

1. Field of the Invention

This invention relates to well logging methods and apparatus and more particularly to nuclear well logging techniques to determine the presence of undesired water flow in cement voids or channels behind steel well casing in a cased well borehole as well as flow in the borehole and adjacent tubing.

2. Description of the Related Art

Undesired fluid communication along the cased portion of a well between producing zones has long been a problem in the petroleum industry. The communication of fresh or salt water from a nearby water sand into a petroleum production sand can contaminate the petroleum being produced by the well to an extent that production of petroleum from the well can become commercially unfeasible due to the "water cut". Similarly, in near surface water wells used for production of fresh water for city or town drinking supplies or the like, the contamination of the fresh water drinking supply by the migration of salt water from nearby sands can also contaminate the drinking water supply to the extent where it is unfit for human consumption without elaborate contaminant removal processing.

In both of these instances, it has been found through experience over the course of years that the contamination of fresh water drinking supplies or producing petroleum sands can occur many times due to the undesired communication of water from nearby sands down the annulus between the steel casing used to support the walls of the borehole and the borehole wall itself. Usually steel casing which is used for this purpose is cemented in place. If a good primary cement job is obtained on well completion, there is no problem with fluid communication between producing zones. However, in some areas of the world where very loosely consolidated, highly permeable sands are typical in production of petroleum, the sands may later collapse in the vicinity of the borehole even if a good primary cement job is obtained. This can allow the migration of water along the outside of the cement sheath from a nearby water sand into the producing zone. Also, the problem of undesired fluid communication occurs when the primary cement job itself deteriorates due to the flow of fluids in its vicinity. Similarly, an otherwise good primary cement job may contain longitudinal channels or void spaces along its length which permit undesired fluid communication between nearby water sands and the producing zone.

Another problem which can lead to undesired fluid communication along the borehole between producing oil zones and nearby water sands is that of the so called "microannulus" between the casing and the cement. This phenomenon occurs because when the cement is being forced from the bottom of the casing string up into the annulus between the casing and the formations, (or through casing perforations), the casing is usually submitted to a high hydrostatic pressure differential in order to force the cement into the annulus. The high pressure differential can cause casing expansion. When this pressure is subsequently relieved for producing from the well, the previously expanded casing may contract away from the cement sheath formed about it in the annulus between the casing and the formations. This contraction can leave a void space between the casing and the cement sheath which is sometimes referred to as a microannulus. In some instances, if enough casing expansion has taken place during the process of primary cementing (such as in a deep well where a high hydrostatic pressure is required) the casing may contract away from the cement sheath leaving a microannulus sufficiently wide for fluid to communicate from nearby water sands along the microannulus into the producing perforations and thereby produce an undesirable water cut.

U.S. Pat. No. 4,032,780 to Paap et al. teaches a method of determination of the volume flow rate and linear flow velocity of undesired behind casing water flow is provided. A well tool having a 14 MeV neutron source is used to continuously irradiate earth formations behind well casing. The continuous neutron irradiation activates elemental $O^{16}$ nuclei in the undesired water flow to be detected. Dual spaced gamma ray detectors located above or below the neutron source detect the decay of unstable isotope $N^{16}$ and from these indications the linear flow velocity of the undesired water flow is deduced. By then estimating the distance R to the undesired flow region the volume flow rate V may be deduced.

U.S. Pat. No. 5,461,909 to Arnold teaches a modification of the Paap technique in which the linear flow velocity, the Full Width Half Maximum time period, and the total count are determined directly from the resulting count rate curve. The radial position and the flow rate are determined using the predetermined relationship between the Full Width Half Maximum time period, radial position, and linear flow velocity, and the predetermined relationship between linear flow velocity, radial position, and the ratio of the flow rate to the total count for the logging tool. The direction of flow is determined by sensing the presence or absence of flowing $N^{16}$ above or below the source.

The references discussed above do not address the problem of more than one type of fluid flowing in the borehole. U.S. Pat. No. 5,404,752 to Chace et al. teaches a method for measuring the velocities of water volumes flowing co-directionally in separate conduits nested such as in injection or production well-bores. The method allows an oxygen activation measurement of the velocity of the water flow in the tubing-casing annulus in the presence of water flowing in the tubing string in the same direction. The method allows continuous logging at variable or constant cable velocities or stationary logging. Based on the method of velocity gauging, the method isolates the signal from the annular flow and can produce a continuous log of linear and volumetric annular flow rates with depth.

The methods discussed above are based on measurements of total counts within a specified energy window. As noted above, the method of Paap requires continuous irradiation. The method of Arnold uses a pulsed neutron source and requires correction for the background signal. In Arnold and in Chace, pulsing is carried out at relatively high frequencies. The method of Chace, when applied to dual flow, first determines an inner flow rate and then uses this determined inner flow rate for determination of an outer flow rate. It would be desirable to have a method in which such correction for background signals and the sequential determination of flow rates is not necessary. The present invention addresses this need.

SUMMARY OF THE INVENTION

The present invention is a method of and an apparatus for determining a flow velocity of a first fluid in a borehole in an earth formation. The earth formation is irradiated with a pulsed radiation source. A first temporal signal indicative of activation of the source and a second temporal signal are obtained at a location spaced apart from the source. The first temporal signal may be obtained either from scattered gamma rays emitted as a result of the oxygen activation process (during the decay of the $N^{16}$ nuclei back to $O^{16}$) at an intermediate position or may be obtained from inelastic gamma rays at the same location. In the first case, the distance between first and second temporal signals is equivalent to the first detector-to-second detector spacing, and in the second case, the distance between the first and second temporal signals is equivalent to the source-to-detector spacing. The radiation source may be a pulsed neutron source that activates nuclei of $O^{16}$ in the fluid to $N^{16}$. The subsequent decay of $N^{16}$ produces gamma rays that may be measured by the two detectors. In one embodiment of the invention, both detectors respond to the produced gamma rays, in which case the distance between the two detectors is used in the velocity determination.

The velocity determination may be based on a correlation of the first and second temporal signals. A surface or downhole processor may be used for the velocity determination. The temporal signals may be scaled. Alternatively, the velocity determination may be based on correlation of time derivatives of the first and second temporal signals. The first and second temporal signals comprise accumulated counts of detector measurements over a time sampling interval. Use of a third detector makes possible determination of flow velocities of two fluids in the borehole. The fluids in the borehole may be within a tubing or in an annulus outside a casing within said borehole. Optionally, semblance methods may be used for analysis of the temporal signals.

With proper calibration, a volumetric flow rate of the fluids may be determined. Once the volumetric flow rate and the flow velocity are known, an effective area of flow may be determined. In an optional embodiment of the invention, effective distances may be used instead of the actual distances to account for differences between the leading and trailing edges of the temporal signals. Calibration is needed to establish the effective distances.

The radiation source is typically pulsed at regular intervals. To avoid aliasing problems, random pulsing may be used. An alternate embodiment of the invention alters a duration of the pulsing at a predetermined interval to avoid aliasing.

BRIEF DESCRIPTION OF THE FIGURES

The present invention is best understood with reference to the accompanying figures in which like numerals refer to like elements, and in which:

FIG. 1 (prior art) is an exemplary schematic diagram of an apparatus suitable for use with the method of the present invention;

FIG. 2 (prior art) is an enlargement of that portion of FIG. 1 involving the logging instrument;

DETAILED DESCRIPTION OF THE INVENTION

Figure 3:
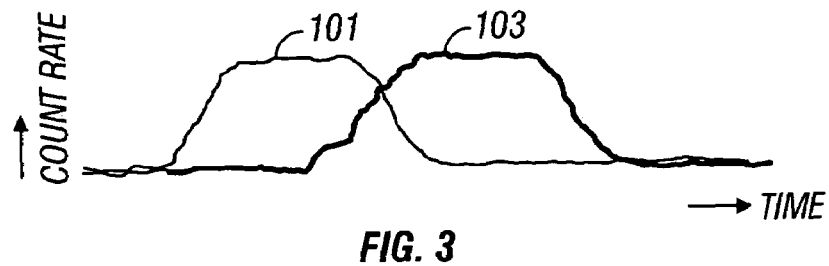
FIG. 3 is a schematic illustration of temporal signals (after normalization) measured at two spaced apart detectors.

FIGS. 1 and 2 represent a cross section of a portion of an injection well penetrating a subsurface formation 10 to a region associated with an injection zone 12. Casing 14 includes multiple perforations 16 opposite the porous injection zone 12. Injection tubing 18, nested inside casing 14 is provided with openings 19 so that the injection fluid flows under pressure into the annulus 20 between the inner conduit or tubing 18 and outer conduit or casing 14, thence into the formation via the perforations 16 to sweep oil towards a production well (not shown). Packers 13 and 15 confine the injection water in casing 14 to a desired production zone 12. The water flow volumes in the annulus and in the tubing are co-directional as shown by the arrows V1 and V2 respectively though this is not a limitation of the method of the present invention. The velocity of the logging instrument 22 is symbolized by arrow Vc (velocity of cable).

The logging instrument 22 is a modification of a conventional neutron logging instrument. It comprises an elongated mandrel 24 of suitable material supported by a cable 26 that is coupled to the draw works 27 at the surface for deployment through the inner conduit or injection tubing 18. The velocity of the instrument 22 as it is drawn through the conduit 18 is measured by an odometer/velocimeter of any well known type 29 that may be associated with a sheave over which the supporting cable 26 passes.

A pulsed neutron source 28 is mounted inside one end of the instrument 22 and separated from interiorly-mounted near and far gamma ray detectors 30 and 32 by a shield 34. A third gamma ray detector 36 may be provided. It is to be understood that the detectors may be mounted beneath the source as shown in FIG. 1 or above the source, or any combination thereof, i.e., at least one below and at least one above. The selection of the configuration depends upon the direction of the water flow to be measured. A mechanical flowmeter 40 is secured to the bottom of the instrument 22 for measuring the velocity of the fluid in the inner conduit relative to the instrument. Signal processing electronic circuitry (not shown) is installed in compartments of the instrument to discriminate against low level gamma ray activity in favor of the higher energy deriving from the activated oxygen. The detector count rates are digitized downhole and are telemetrically transmitted to the surface through suitable conductors in supporting cable 26 to processing and archival storage unit 31 at the surface. Optionally, a satellite communication link (not shown) may be provided with the data being transmitted to a remote location. In one embodiment of the invention, four detectors may be provided at distances of 1, 2, 4 and 12 ft. In an alternate embodiment of the invention, a processor is provided downhole.

In prior art methods, such as that in Chace, the neutron source is pulsed at 1 kHz for 28 milliseconds (ms) and is then shut off for 8 ms during which time the count rate measurement is made. In contrast, in the present invention, the neutron source may be ramped up to a maximum level over a ten second interval, maintained at a substantially constant value for twenty to forty seconds or so, and then ramped down over a ten second interval. Alternatively, the source activation and deactivation may be substantially instantaneous. Each of the detectors measures count rates or signals. Count rates from each of the detectors are accumulated by a processor over a suitable time sampling interval, with a typical sampling frequency, for example, of 0.5 seconds. These count rates are made over a suitable energy level. In one embodiment of the invention, received gamma rays having energies above 3.5 MeV are counted. The upper limit of the energy window may be 8 MeV or so. The accumulated count rates define a temporal signal.

Turning now to FIG. 3, the basic principle of the method of the present invention are described. Shown are curves 101 and 103 that depict temporal signals measured at two detectors. The abscissa is time and the ordinate is the accumulated count rate over the temporal sampling interval. As noted above, the sampling frequency is typically every 0.5 seconds, and total measurement time can vary depending on the flow velocity and source-detector or detector-detector spacing. For the case where there is only a single velocity of flow, the signal 101 corresponds to measurements made by a detector that is closer to the source than the detector that measured signal 103. Since the signals are the result of radioactive decay of $N^{16}$ with a half life of about 7.13 seconds, the absolute level of the signal measured by the farther detector will be less than the absolute level of the signal measured by the closer detector. In the plot shown in FIG. 3, suitable normalization of the signals has been done so that they appear to be of comparable amplitude. The spacing $\Delta d$ between the near detector and the far detector is a known quantity. Hence by measuring the time delay $\Delta t$ between signal 101 and signal 103, a velocity of flow $v_r$ can determined by:

$$v_r = \frac{\Delta d}{\Delta t} \quad (1)$$

This determined velocity $v_r$ is a measurement of fluid velocity relative to the velocity of the logging tool $v_t$. When the logging tool is stationary, then the velocity $v_r$ will be the same as the actual fluid velocity. When the logging tool is in motion, then the actual fluid velocity $v_f$ is given by:

$$v_f = v_r + v_t \quad (2)$$

where it is understood that the summation is a vector summation. For the remainder of the discussion of the method of the present invention, it is assumed that the logging tool is stationary, and that suitable correction for the velocity of motion of the tool can be made.

Figure 4:
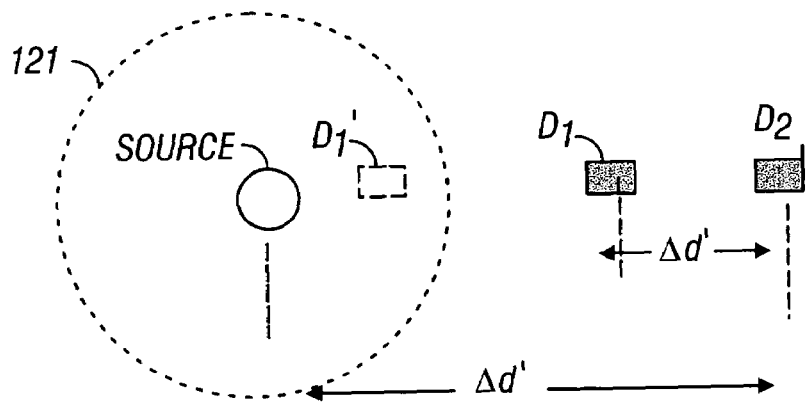
FIG. 4 illustrates a situation where the near detector is immediately responsive to source activation.

In one embodiment of the present invention, the time delay $\Delta t$ is obtained by cross-correlation of the signals 101 and 103. When the near detector is sufficiently far from the source, the signal 101 corresponds to the activation of $O^{16}$ to $N^{16}$ and the resulting gamma rays produced by decay of $N^{16}$. However, if the near detector is sufficiently close to the source, it may respond immediately to the source activation due to inelastic and capture events. This is depicted in FIG. 4 wherein if the near detector $D_1'$ is within the region of inelastic or capture events denoted by 121, then it responds immediately to the source activation. The far detector $D_2$ responds to the $N^{16}$ after a time delay corresponding to fluid flow from the source position to the detector position $D_2$ and the associated distance $\Delta d'$.

Figure 5:
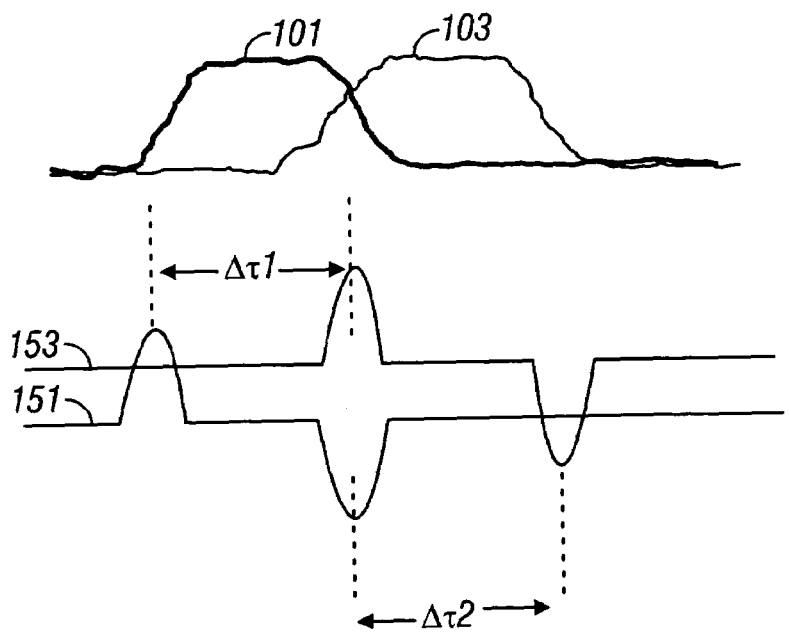
FIG. 5 illustrates an embodiment of the invention wherein differentiation of the signals is carried out.

The time delay may also be obtained by identifying the point of inflection of signals from the rising and falling edge of signals 101 and 103. This is shown in FIG. 5 where, as before, 101 and 103 are the signals at the two detectors. The curves 151 and 153 are the first derivatives with respect to time of the curves 101 and 103. The time delay can then be obtained from $\Delta \tau_1$, the time delay between the peaks of 151 and 153, or from $\Delta \tau_2$, the time delay between the troughs of 151 and 153.

Figure 6A:
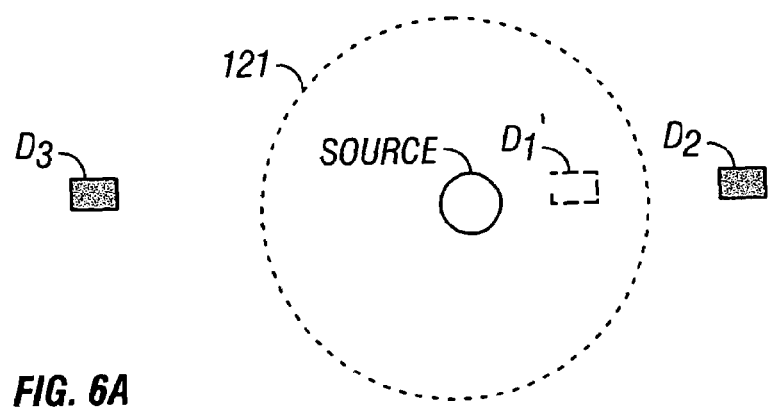
FIG. 6a–6b illustrates a configuration for detection fluid flow in two different directions.
Figure 6B:
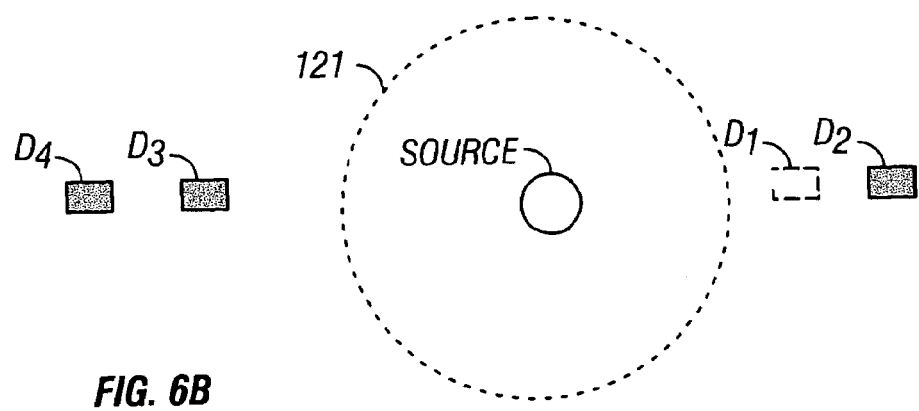

In another embodiment of the invention, fluid flow in any direction can be measured. This requires at least two gamma ray detectors disposed on opposite sides of the source for determining the decay signals from $N^{16}$. These are denoted by $D_2$ and $D_3$ in FIG. 6a. In addition, a single detector denoted by $D_1'$ responsive to inelastic signals resulting from the source activation is needed to provide a reference time. As an alternative to the single detector $D_1'$, the arrangement of FIG. 6b can be used with two detectors responsive to $N^{16}$ decay signals on either side of the source.

Those versed in the art would recognize that in some respects, the signals received here at fixed source-detector distances and characterized by a velocity of transit, are similar to those in acoustic signals in boreholes. There is a well developed methodology for analysis of such acoustic signals based on semblance analysis. Also well developed is the so called tau-p transform where signals in the time—offset domain are transformed to the intercept time—slowness domain (slowness being the reciprocal of velocity). Semblance analysis or stacking of the transformed signals in the τ-p domain along lines of constant slowness (or velocity) is a well known method for identifying signals that have a linear moveout in the time-offset domain. These methods are particularly useful in differentiating between signals with different velocities of propagation. Such methods are well known in the art of acoustic signal processing and are not discussed herein. An example of such processing is given in U.S. Pat. No. 6,023,443 to Dubinsky et al., having the same assignee as the present invention and the contents of which are fully incorporated herein by reference. In the context of the present invention, these transform techniques are useful in processing of signals from multiple detectors and separating out fluid flows with possibly different directions and/or different velocities.

Figure 7A:
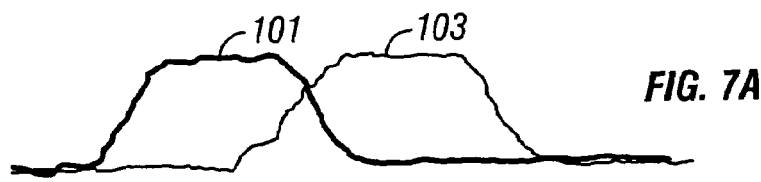
FIGS. 7a–7c illustrate an embodiment of the invention simulating a prior art steady state method.
Figure 7B:
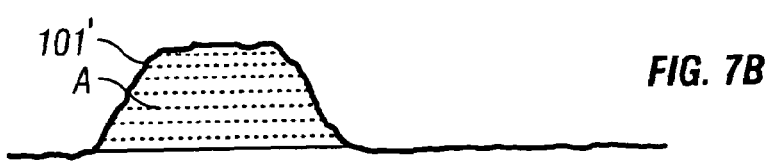
Figure 7C:
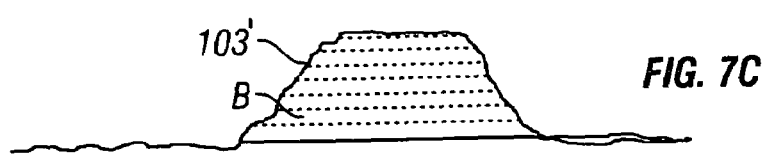

A hybrid technique may be used, whereby the data from the method can be processed slightly differently and used in the steady state velocity measurement method of prior art. If we integrate the count rates from each of two detectors during the time the activated water signal is present, correcting the counts for background, we can apply them into the following standard formula:

$$v_f = v_t + \frac{\lambda \Delta d}{\ln\left(\frac{A}{B}\right) + \ln\left(\frac{D_1}{D_2}\right)} \quad (3)$$

where A and B are the count rates from the detectors found by integration, $\Delta d$ is the spacing between the detectors, $v_t$ is the logging speed and $\lambda$ is the decay constant of activated Oxygen. The D terms are detector balance terms. This is illustrated schematically in FIGS. 7a–7c. Shown in FIG. 7a are illustrative signals 101 and 103 at two different detectors. FIG. 7b shows signal 101' with the area A indicative of total count rates for the near detector. FIG. 7c shows signal 103' and the count rates for the far detector.

The neutron source generating the neutrons does not act like a point source, i.e., the water it activates has a "length".

When the source is turned on, the water a small distance ahead of the source becomes activated and hits the detector slightly faster than water at the source position reaches the detector. Conversely when the source is switched off the water slightly behind the source is still activated and takes slightly longer to reach the detector than predicted. In one embodiment of the invention, an effective spacing shorter than the true spacing is used for the rising edge. Conversely, an effective spacing longer than the true spacing is used for the trailing edge. A calibration is performed by recording data in a static water-filled environment (in situ) while moving the instrument at a known constant speed. The instrument speed can then be used as the effective water velocity and the data processed to solve for the effective source to detector spacings for the rising and falling edges.

In one embodiment of the invention, the calibration is used to determine the volume of moving water. Calibration may be performed in an area of a borehole of known diameter that is substantially full of water: The water velocity is known and the count rate integrated from the data for that velocity can be obtained. Hence the response function which describes the count rate response of a detector with respect to water velocity can be determined and only varies with one other unknown variable, namely the source output. The data from the calibration which defines the count rate at a known velocity and volume of water for a fixed source output value. This makes it possible to fit the theoretical response to the data such that for any velocity calculated during a logging operation we can determine from the count rate the water volume present relative to the volume present during calibration. The volume is a ratio of count rates which have been corrected for velocity.

Figure 8:
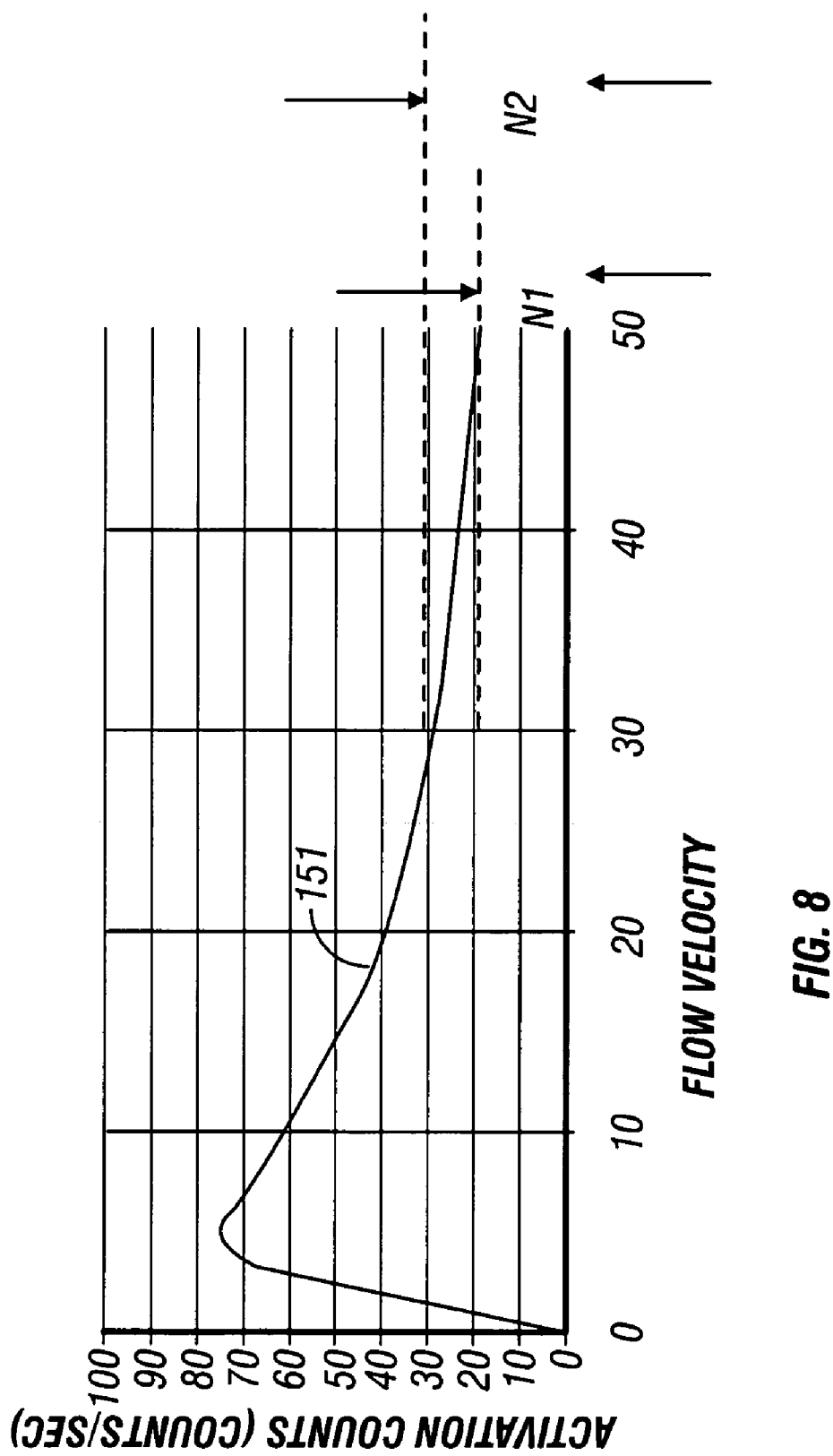
FIG. 8 illustrates a method for determination of flow volume.

This is illustrated schematically in FIG. 8. The curve 151 is a calibration curve showing the count rate as a function of flow velocity (for 100% water). As an example, if a flow velocity of 30 ft/min is measured, then if the flow were 100% water, the expected count rate would be given by N2. If an actual count rate of N1 is measured, then the water volume is simply given by the fraction N1/N2. Knowing the water volume and the flow velocity, an effective area of flow can be determined.

A potential source of error can occur when the activated oxygen takes longer to reach the detector than the time between source "on" periods. This can lead to false velocity determination by correlating the detector pulse with the wrong source on period. This is referred to in signal processing by the term "aliasing." To prevent this mismatch from occurring, in one embodiment of the invention, for every N cycles of the source "on" cycle, the source activation is characterized by a unique synchronization signal. The number N may be any integer greater than, say 5 or so. Examples of such synchronization signals include (i) increasing the source "on" time by a predetermined factor, (ii) decreasing the source "on" time by a predetermined factor, and, (iii) skipping a source "on." In another embodiment of the invention, the source activation time is random and actual activation cycle is available to the processor.

In an alternate embodiment of the invention, a single detector spaced apart from the source may be used. The response of the detector to inelastic and capture gamma rays resulting from the source activation is substantially instantaneous. Consequently, the response of the detector may be used as an indication of the source activation time. The response of the detector to scattered gamma rays emitted as a result of the oxygen activation process (during the decay of the $N^{16}$ nuclei back to $O^{16}$) is, as in the embodiment described above, responsive to the flow of fluids. The effective spacing for calculation of velocity is the distance between the source and detector. This method is an improvement over that described in Simpson et al. wherein the initiation time is taken from the electronic pulse used to activate the neutron source. This alternate embodiment uses an initial time based on the output of the neutron source: this would correct for any time delays inherent in the process of turning on the neutron source.

The flow rates for two different fluid flows can also be determined using the single detector embodiment. For example, consider two concurrent flows that travel in the same direction, but in one flow is inside tubing and the other is in the space between the tubing and outer casing (or, tubing-casing annulus). The gamma ray detector, for example, can detect a signal which has two distinct inflection points, due to the different arrival times of the tubular and annular activation signals. The methods for detecting inflections points described above can be extended to determine the two inflection points in the second temporal signal (i.e. gamma ray detector response) and correlation with the first temporal signal can be performed to determine the two velocities.

The method as described above [0026] can be extended to determine the volume of the two (or more) water flows detected and measured by the method described [0030] or by any other methods for measuring concurrent water flows described above.

Those skilled in the art will devise other embodiments of the invention which do not depart from the scope of the invention as disclosed herein. Accordingly the invention should be limited in scope only by the attached claims.

What is claimed is:

1. A method of determining a flow velocity of a first fluid in a borehole in an earth formation, the method comprising:
   (a) irradiating the earth formation with a pulsed radiation source;
   (b) obtaining a first temporal signal resulting from the irradiation, the first temporal signal comprising inelastic gamma rays, the first temporal signal indicative of a time of activation of the source;
   (c) obtaining at least one second temporal signal resulting from the irradiation, the second temporal signal comprising scattered gamma rays measured by at least one detector; and
   (d) determining the flow velocity based on analysis of the first temporal signal, the at least one second temporal signal, and a distance between one of (A) a location where the first temporal signal is measured and the at least one detector, and (B) the source and the at least one detector.

2. The method of claim 1 wherein said pulsed radiation source comprises a pulsed neutron source.

3. The method of claim 1 wherein said irradiation transforms nuclei of $O^{16}$ in said first fluid to nuclei of $N^{16}$, said nuclei of $N^{16}$ producing gamma rays.

4. The method of claim 1 wherein determining the flow velocity is based on a correlation between the first temporal signal and the at least one second temporal signal.

5. The method of claim 1 further comprising scaling the first temporal signal ad said at least one second temporal signal.

6. The method of claim 1 wherein determining the flow velocity is based on time differentiating the first temporal signal and the at least one second temporal signal to provide a first time differentiated signal and at least one second time differentiated signal.

7. The method of claim 6 wherein further comprising correlating the first time differentiated signal and the at least one second time differentiated signal.

8. The method of claim 6 further comprising scaling the first temporal signal and the at least one second temporal signal prior to said time differentiating.

9. The method of claim 1 further comprising determining a flow velocity of a second fluid in the borehole.

10. The method of claim 9 wherein the first fluid and the second fluid are in one of (i) one or more tubings within the borehole, and (ii) in an annulus outside a casing within said borehole.

11. The method of claim 1 wherein determining the flow velocity is based on a semblance between the first temporal signal and at the least one second temporal signal.

12. The method of claim 1 further comprising using a calibration measurement for determining a volumetric flow rate of the first fluid.

13. The method of claim 12 further comprising determining from the flow velocity and the volumetric flow rate an effective area of flow of the first fluid.

14. The method of claim 1 wherein said distances in (c) are effective distances determined from actual distances by a calibration.

15. The method of claim 1 wherein the radiation source is pulsed at one of (i) a regular interval, and (ii) a random interval.

16. The method of claim 15 further comprising altering a duration of a pulsing of the source at a predetermined interval.

17. The method of claim 1 wherein the first temporal signal comprises an accumulation of counts over a time sampling interval.

18. An apparatus for determining a flow velocity of a first fluid in a borehole in an earth formation, the apparatus comprising:
   (a) a pulsed radiation source configured to irradiate the earth formation;
   (b) a detector arrangement configured to produce:
      (A) a first temporal signal responsive to inelastic gamma rays resulting from the irradiation, the first signal indicative of an activation time of the source; and
      (B) a second temporal signal responsive to scattered gamma rays resulting from the irradiation; and
   (c) a processor configured to determine the flow velocity of the first fluid from:
      (A) the first temporal signal and the second temporal signal; and
      (B) a distance between at least one of (I) a location where the first temporal signal is produced and the location where the second temporal signal is produced, and (II) the source and a location where the second temporal signal is produced.

19. The apparatus of claim 18 wherein said pulsed radiation source comprises a pulsed neutron source.

20. The apparatus of claim 18 wherein said irradiation transforms nuclei of $O^{16}$ in said first fluid to nuclei of $N^{16}$, said nuclei of $N^{16}$ producing gamma rays.

21. The apparatus of claim 18 wherein said processor is configured to determine the flow velocity based on a correlation between said first and at least one second signal.

22. The apparatus of claim 18 wherein the processor is configured to determine the flow velocity based on time differentiating the first temporal signal and the at least one second temporal signal to provide a first time differentiated signal and at least one second time differentiated signal.

23. The apparatus of claim 18 wherein the at least one detector arrangement further comprises at least two detectors.

24. The apparatus of claim 18 wherein the processor is further configured to determine a flow velocity of a second fluid in said borehole.

25. The apparatus of claim 24 wherein the first fluid and the second fluid are in one of (i) one or more tubings within the borehole, and (ii) in an annulus outside a casing within the borehole.

26. The apparatus of claim 18 wherein said processor is further configured to use a calibration measurement for determining a volumetric flow rate of the first fluid.

27. The apparatus of claim 26 wherein the processor is further configured to determine from the flow velocity and said volumetric flow rate an effective area of flow of the first fluid.

28. The apparatus of claim 18 wherein the radiation source is configured to be pulsed at one of (i) a regular interval, and (ii) a random interval.

29. The apparatus of claim 18 wherein the processor is configured to alter a duration of a pulsing of said source at a predetermined interval.

30. The apparatus of claim 18 wherein the processor is at one of (i) a surface location, and (ii) a downhole location.

31. The apparatus of claim 18 wherein said processor is configured to perform an integration of said first and said at least one second temporal signal.

32. A method of determining a flow velocity of a first fluid in a borehole in an earth formation, the method comprising:
   (a) irradiating the earth formation with a pulsed radiation source;
   (b) obtaining a first temporal signal resulting from the irradiation, the first temporal signal comprising an accumulation of counts made by a detector over a time sampling interval, the first temporal signal indicative of a time of activation of the source;
   (c) obtaining at least one second temporal signal resulting from the irradiation at at least one detector spaced apart from the source; and
   (d) determining the flow velocity based on analysis of the first temporal signal, the at least one second temporal signal, and a distance between one of (A) a location where the first temporal signal is measured and the at least one detector, and (B) the source and the at least one detector.

33. The method of claim 32 wherein the first temporal signal comprises inelastic gamma rays measured by the at least one detector and the second temporal signal comprises scattered gamma rays measured by the at least one detector.

34. An apparatus for determining a flow velocity of a first fluid in a borehole in an earth formation, the apparatus comprising:
   (a) a pulsed radiation source configured to irradiate the earth formation;
   (b) a detector configured to produce a first temporal signal responsive to the irradiation, the first signal indicative of an activation time of the source, a first temporal signal comprising an accumulation of counts made by the detector;
   (c) at least one detector spaced apart from the source configured to produce a second temporal signal responsive to said irradiation; and
   (d) a processor configured to determining the flow velocity of the first fluid from:
      (A) the first temporal signal and the second temporal signal; and
      (B) a distance between at least one of (I) the detector that produces the first signal and the at least one detector, and (II) the source and the at least one detector.

* * * * *